US008851460B2

(12) United States Patent
Muska

(10) Patent No.: US 8,851,460 B2
(45) Date of Patent: *Oct. 7, 2014

(54) SYSTEM AND METHOD FOR TUNING THE RESONANCE FREQUENCY OF AN ENERGY ABSORBING DEVICE FOR A STRUCTURE IN RESPONSE TO A DISRUPTIVE FORCE

(76) Inventor: Martin A. Muska, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,862

(22) Filed: Feb. 29, 2012

(65) Prior Publication Data

US 2012/0152676 A1 Jun. 21, 2012

Related U.S. Application Data

(63) Continuation of application No. 12/098,316, filed on Apr. 4, 2008, now Pat. No. 8,127,904.

(51) Int. Cl.
*F16M 1/00* (2006.01)
*F16F 7/10* (2006.01)
*G08C 17/00* (2006.01)

(52) U.S. Cl.
CPC ............ *G08C 17/00* (2013.01); *G08C 2201/51* (2013.01)
USPC .......................................... 267/136; 188/378

(58) Field of Classification Search
USPC ........... 188/378–380; 267/136; 248/550, 562; 52/167.1–167.8
See application file for complete search history.

(56) References Cited

U.S. PATENT DOCUMENTS

| 440,938 A | 11/1890 | Anthoni |
| 2,893,665 A | 7/1959 | Paulsen |
| 3,337,167 A | 8/1967 | Johnson |
| 3,601,345 A | 8/1971 | Johnson |
| 3,782,788 A | 1/1974 | Koester et al. |
| 3,794,277 A * | 2/1974 | Smedley et al. ............... 248/548 |
| 3,806,889 A | 4/1974 | Peterson et al. |
| 3,906,689 A | 9/1975 | Nakayama |
| 4,191,495 A | 3/1980 | Rivacoba et al. |
| 4,266,379 A | 5/1981 | Valencia Aguilar |
| 4,362,424 A | 12/1982 | Barber |
| 4,633,628 A | 1/1987 | Mostaghel |
| 4,644,714 A | 2/1987 | Zayas |
| 4,713,917 A | 12/1987 | Buckle et al. |
| 4,742,998 A * | 5/1988 | Schubert ....................... 267/136 |

(Continued)

FOREIGN PATENT DOCUMENTS

EP 0115174 8/1984

OTHER PUBLICATIONS

U.S. Appl. No. 11/929,080, Muska.

*Primary Examiner* — Christopher Schwartz
(74) *Attorney, Agent, or Firm* — Jafari Law Group; David V. Jafari

(57) ABSTRACT

The invention is a system and method for automatically adjusting the resonance frequency of an energy absorbing device in response to a disruptive force. By configuring an energy absorbing device for automatic response tuning, utilizing a controller coupled to one or more sensors for processing a determination primarily based on sensing data, the natural period of an overall structure may be adjusted (i.e. increased or decreased) so that the acceleration response of the structure is decreased upon being subjected to a disruptive force, for example, high winds, a blast from an explosion, or a seismic force caused by an earthquake.

18 Claims, 11 Drawing Sheets

(56) References Cited

U.S. PATENT DOCUMENTS

| | | | |
|---|---|---|---|
| 4,761,925 A | 8/1988 | Fukahori | |
| 4,879,857 A | 11/1989 | Peterson et al. | |
| 4,881,350 A | 11/1989 | Wu | |
| 4,887,788 A | 12/1989 | Fischer et al. | |
| 4,899,323 A | 2/1990 | Fukahori et al. | |
| 4,974,378 A | 12/1990 | Shustov | |
| 4,991,366 A | 2/1991 | Teramura et al. | |
| 5,022,201 A * | 6/1991 | Kobori et al. | 52/167.2 |
| 5,036,633 A * | 8/1991 | Kobori et al. | 52/1 |
| 5,083,404 A | 1/1992 | Schulte | |
| 5,102,107 A | 4/1992 | Simon et al. | |
| 5,174,552 A * | 12/1992 | Hodgson et al. | 267/140.11 |
| 5,339,580 A | 8/1994 | Koshika et al. | |
| 5,353,559 A | 10/1994 | Murota et al. | |
| 5,363,610 A | 11/1994 | Thomas et al. | |
| 5,456,047 A * | 10/1995 | Dorka | 52/167.4 |
| 5,462,141 A * | 10/1995 | Taylor | 188/280 |
| 5,487,534 A | 1/1996 | Sakamoto et al. | |
| 5,502,932 A | 4/1996 | Lu | |
| 5,560,162 A | 10/1996 | Kemeny | |
| 5,597,240 A | 1/1997 | Fyfe | |
| 5,682,712 A | 11/1997 | Kemeny | |
| 5,765,313 A * | 6/1998 | Lee et al. | 52/1 |
| 5,765,322 A | 6/1998 | Kubo et al. | |
| 5,797,228 A | 8/1998 | Kemeny | |
| 5,862,638 A | 1/1999 | Holland et al. | |
| 5,868,894 A | 2/1999 | Frenkel | |
| 5,884,440 A | 3/1999 | Kubo et al. | |
| 5,924,261 A | 7/1999 | Fricke | |
| 5,946,866 A | 9/1999 | Weglewski et al. | |
| 5,979,126 A * | 11/1999 | Kurino et al. | 52/167.2 |
| 5,984,062 A * | 11/1999 | Bobrow et al. | 188/378 |
| 6,085,474 A | 7/2000 | Mizuno | |
| 6,098,969 A * | 8/2000 | Nagarajaiah | 267/136 |
| 6,123,312 A * | 9/2000 | Dai | 248/550 |
| 6,126,136 A | 10/2000 | Yen | |
| 6,141,919 A | 11/2000 | Robinson | |
| 6,224,341 B1 | 5/2001 | Fricke | |
| 6,254,067 B1 | 7/2001 | Yih | |
| 6,327,024 B1 * | 12/2001 | Hayashi et al. | 355/53 |
| 6,695,104 B2 | 2/2004 | Akad | |
| 6,742,312 B2 | 6/2004 | Valentine | |
| D588,285 S | 3/2009 | Muska | |
| 2004/0000104 A1 * | 1/2004 | Fanucci et al. | 52/167.3 |
| 2006/0037257 A1 * | 2/2006 | Newland et al. | 52/167.3 |
| 2008/0015753 A1 | 1/2008 | Wereley et al. | |
| 2009/0158676 A1 | 6/2009 | Sakamoto | |

* cited by examiner

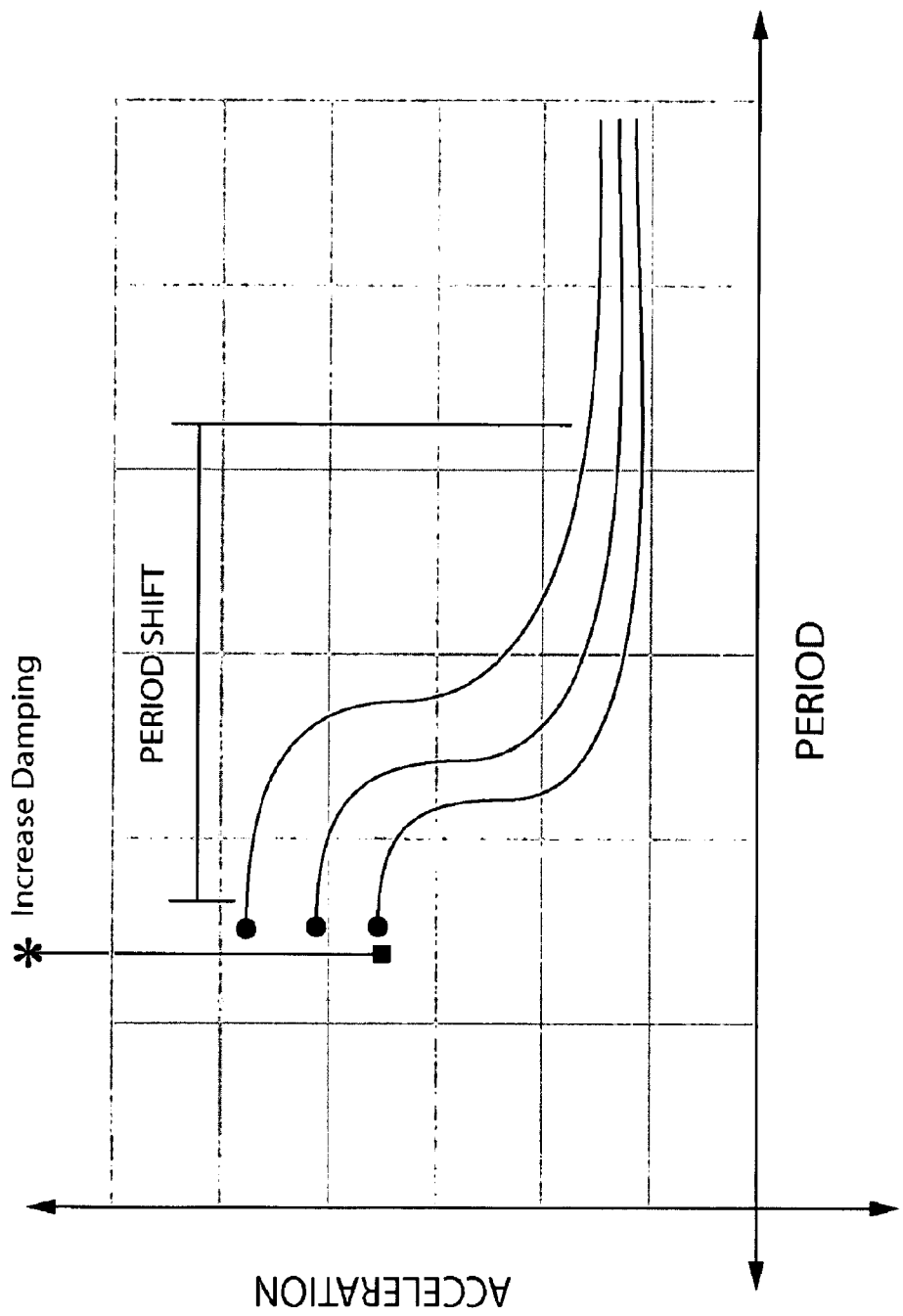

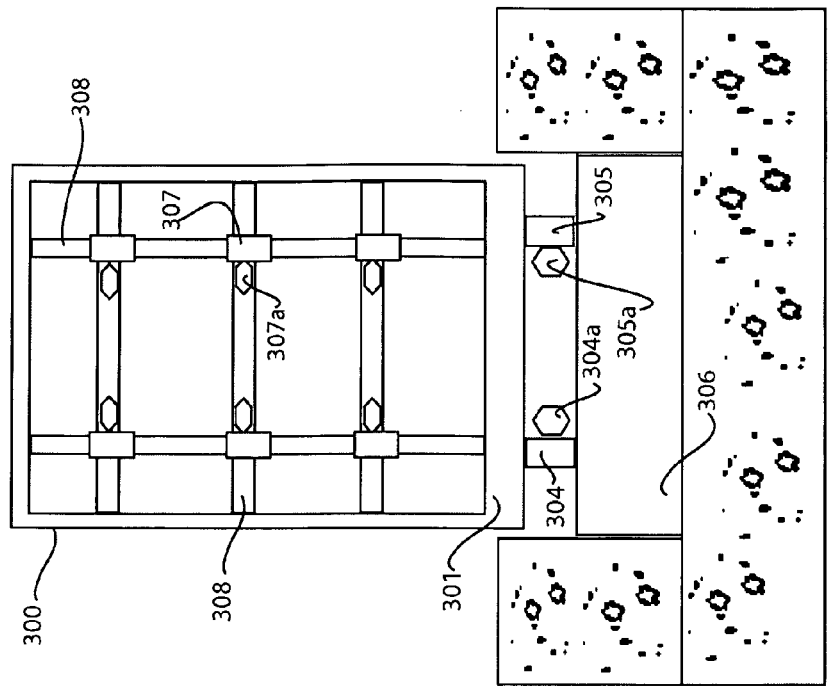
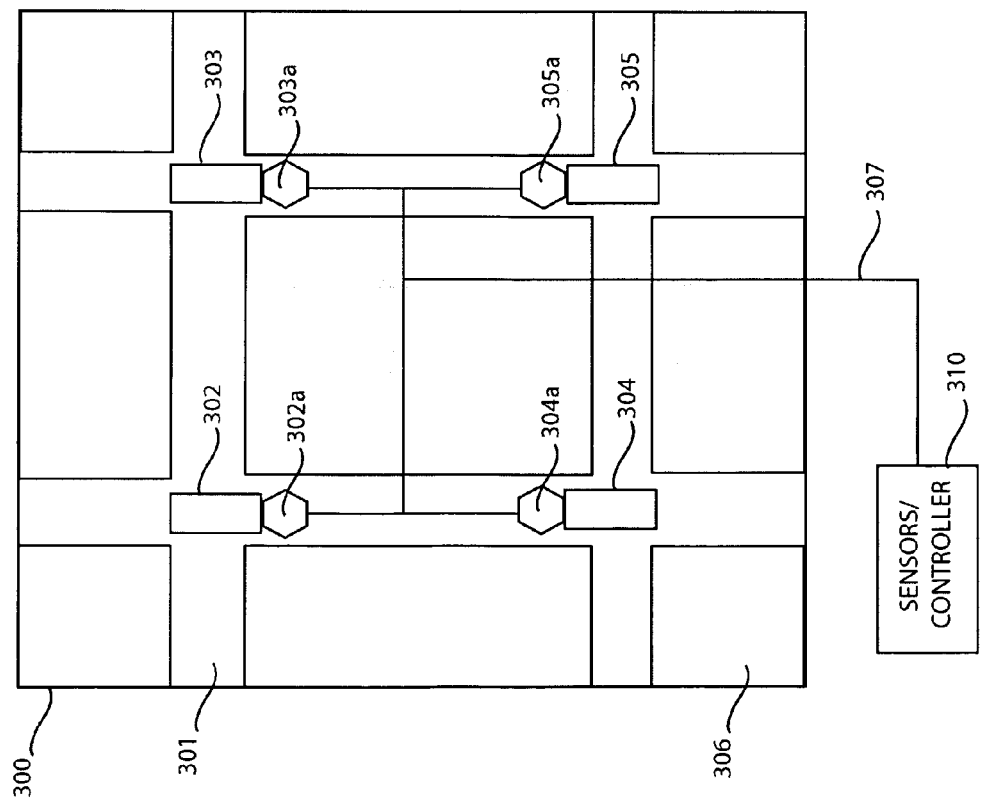
FIG.3(a)
FIG.3(b)

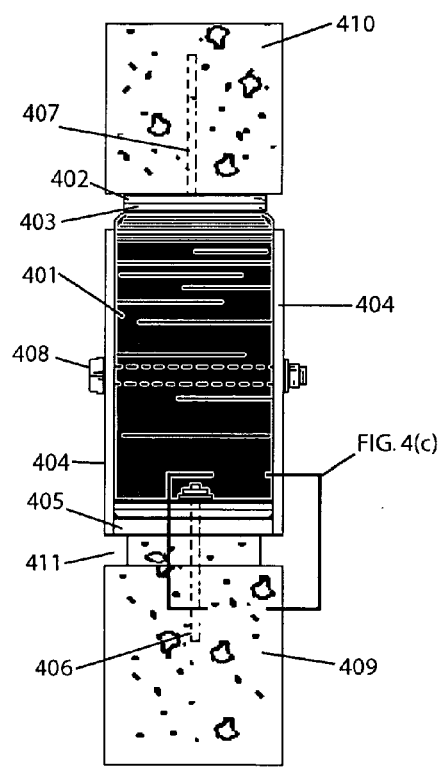
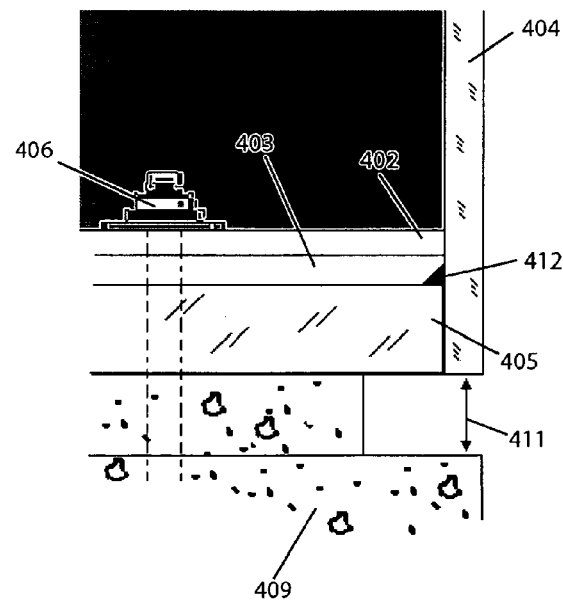
FIG. 4(b)
FIG. 4(c)

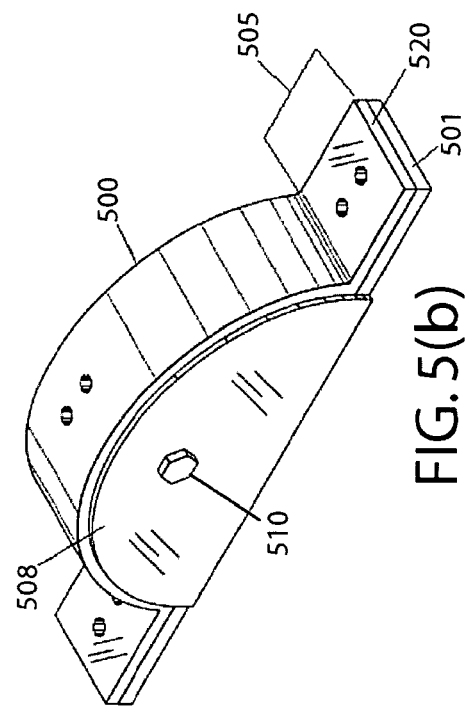
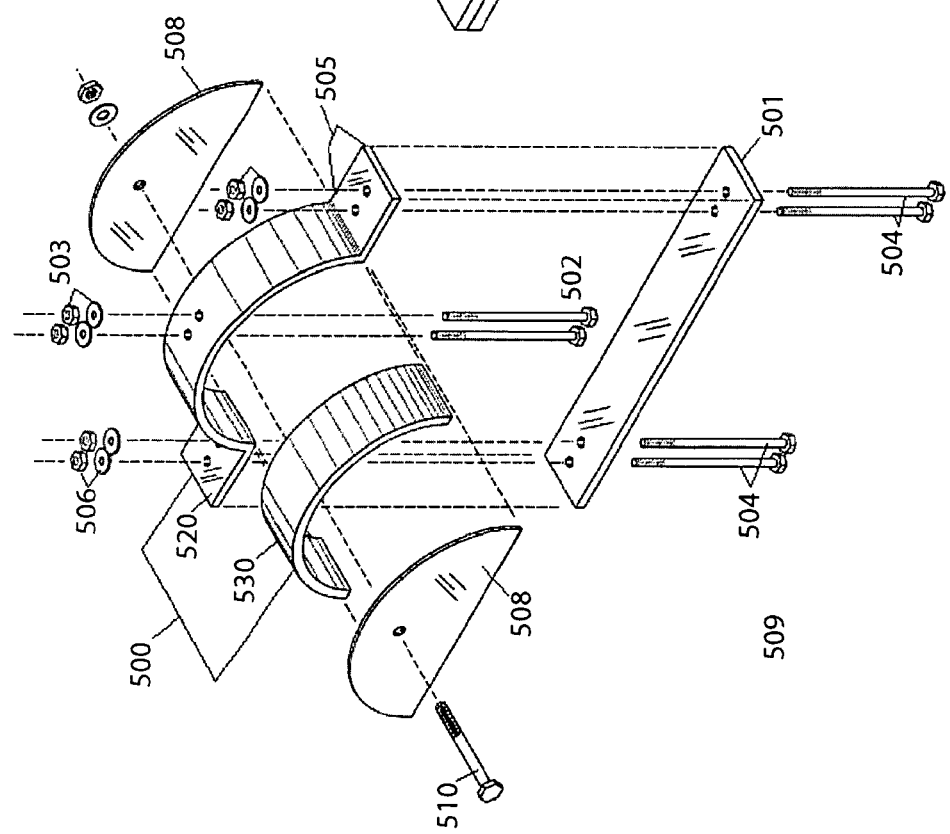
FIG.5(a)
FIG.5(b)

SYSTEM AND METHOD FOR TUNING THE RESONANCE FREQUENCY OF AN ENERGY ABSORBING DEVICE FOR A STRUCTURE IN RESPONSE TO A DISRUPTIVE FORCE

PRIORITY NOTICE

The present application is a continuation application, which claims priority under 35 U.S.C. §120 to U.S. patent application Ser. No. 12/098,316, filed on Apr. 4, 2008, now U.S. Pat. No. 8,127,904 the disclosure of which is incorporated herein by reference in its entirety.

TECHNICAL FIELD OF THE INVENTION

The present invention relates in general to a system and method for automatically adjusting the resonance frequency of an energy absorbing device in response to a disruptive force, and more specifically, configuring an energy absorbing device for automatic response tuning utilizing a controller coupled to one or more sensors, for generating a control signal based on sensing data, in order to increase or decrease the natural period of an overall structure so that the acceleration response of the structure is decreased upon being subjected to a disruptive force.

BACKGROUND OF THE INVENTION

Traditionally, the conventional approach to protecting structures from disruptive forces, for example strong winds, seismic vibrations, or explosions, has been to strengthen structures themselves—either by fortifying a structure's walls and foundations, or simply by utilizing stronger, perhaps heavier materials. In the last few decades, those skilled in the art have understood that such methods are not appropriate for medium to tall structures due to the frequencies that are generated through, for example, buildings or bridges, which ultimately cause the structures to collapse. These old methods of strengthening structures are thus not as effective for any structure as newly developed methods.

Many efforts have also been directed to implementing various types of devices that absorb energy from a disruptive force in order to dampen the disruptive vibrations and prevent vibration forces from damaging structural components or entire structures altogether.

Relatively recent, base isolation devices have been developed to isolate or decouple structures from disruptive forces, such as seismic forces produced during an earthquake, or strong winds, particularly against structures such as buildings. However, these systems have proven expensive and inadequate for smaller structures such as low to mid-rise buildings and family homes.

In addition to the higher cost that makes base isolation and similar devices inadequate for low to mid-rise buildings (i.e. most contractors won't implement such devices in low to mid-rise buildings or family homes in order to keep budgets low), current designs are difficult to predict mathematically, which poses a major problem for engineers.

For structure designs that do implement complex base isolation systems, for example corporate or government buildings, traditional passive systems have been used. However, these traditional passive systems currently in use may react to light winds and occupancy loads in a manner that causes the building to sway slightly. This sway may be felt by the occupants and often causes an undesirable "sea sick" feeling. Thus, since such passive systems' sensitivity may not be adjusted, the structures or building which implement such technology are frequently affected with undesirable motion.

Another one of the problems associated with past efforts to protect a structure from disruptive forces is that it is difficult, if not impossible, to anticipate the degree of strength of the disruptive force, as well as the particular movements of the disruptive force in and around a structure. An energy absorbing device may be able to in fact absorb the energy from a disruptive force; however, if the disruptive force is extremely large or if the structure is vibrated in varying directions, the damage may ultimately lead to the collapse of the structure unless immediate maintenance or adjustments are made following the disruptive event—this is often expensive and requires use of limited resources (i.e. deploying personnel such as technicians, engineers, experts, etc.).

Thus, while present practices have employed methods to repair and adjust structures following disruptive events, for example, an earthquake, or a blast from an explosion, such methods require significant man power and expenditure of valuable resources: trained personnel, eligible engineers, and city inspectors are usually deployed even in response to minor events due to the lack of information available about a particular structure's stability following such an event.

Furthermore, current systems require maintenance during which energy absorbing devices installed within a structure must be routinely inspected in order to assure that the energy absorption system is properly functioning.

Therefore, there is a need in the art for a system and method that is cost effective, requires less maintenance, and is capable of self adjustment and easily adaptable to forces inflicted during an event wherein disruptive forces are applied to a structure. It is to these ends that the present invention has been developed.

SUMMARY OF THE INVENTION

To minimize the limitations in the prior art, and to minimize other limitations that will be apparent upon reading and understanding the present specification, the present invention describes a system and method for automatically adjusting the resonance frequency of an energy absorbing device in response to a disruptive force.

An automatic energy dissipation system, in accordance with the present invention comprises a sensor for detecting a disruptive force applied to a structure; a processor connected to said sensor, configured for determining a control signal based on a sensing data received from said sensor; an energy absorbing device for coupling to said structure; and an actuator, coupled to said processor and connected to said energy absorbing device, for tuning said energy absorbing device based on said control signal generated by said processor, wherein said tuning of said energy absorbing device comprises altering a resonance frequency of said structure to reduce a structural response to said disruptive force applied to said structure.

One method for protecting a structure from disruptive forces, in accordance with the present invention, comprises the steps of generating a sensing data related to a disruptive force; receiving said sensing data; generating a control signal from a determination based on said sensing data; and tuning an energy absorbing device based on said control signal.

It is an objective of the present invention to enhance the protection of a structure that may be subjected to varying types of disruptive forces by implementing an automatic response system equipped with sensors and self modifying energy absorption devices.

It is another objective of the present invention to improve a retaining wall's ability to resist and respond to the surge of earth or ground pressures, for example seismic pressures, by implementing automated actuators adapted for tuning base isolation or energy dissipation devices.

It is yet another objective of the present invention to provide an active way of protecting a structure from varying degrees of force that would typically be able to severely damage or collapse a structure.

It is yet another objective of the present invention to provide an automatic corrective response to a disruptive event by gathering sensing data pertaining to disruptive forces, and altering a resonance frequency based on the sensing data, by tuning an energy absorbing device coupled to a structure.

It is yet another objective of the present invention to automatically tune an energy absorbing device for damping the effect of a disruptive force thereby adjusting a resonance frequency of a structure to prevent damage.

It is yet another objective of the present invention to provide an automatic response system for simultaneously tuning multiple energy absorbing devices coupled to one or more structures.

It is yet another object of the present invention to provide a dynamic automated energy dissipation system that may be implemented in a variety of applications with few or no modifications.

It is yet another objective of the present invention to provide a way of adjusting the resonance frequency of an energy absorbing device attached to a structure that is cost-effective for use in family homes and buildings ranging from one to four stories.

Furthermore, it is yet another objective of the present invention to provide an automated energy absorbing system configuration comprising of a plurality of base isolation units, which may be deployed in a manner so as to cover a multitude of structures while minimizing costs and protecting a greater area from disruptive forces.

These and many other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1($b$) illustrates another block diagram of the system for adjusting a resonance frequency of an energy absorbing device attached to a structure, including a structure containing multiple energy absorbing devices, each of which are coupled with multiple actuators as well as sensors coupled to each actuator, and all of which are coupled to a controller, in accordance with another embodiment of the present invention.

FIG. 2 is a graphical representation of basic principles well known and understood by those skilled in the art, showing how damping and increasing the period of a structure will decrease an acceleration response to a disruptive force thereby minimizing damage to structural components.

FIG. 3($a$) and FIG. 3($b$) illustrate an exemplary configuration for placement of various energy absorbing devices coupled to actuators in accordance with one embodiment of the present invention.

FIG. 4($b$) is a side view of an energy absorbing apparatus installed within a structure, for example between the floor and foundation of a building, in accordance with one embodiment of the present invention.

FIG. 4($c$) is a close-up view of a lower right portion of the energy absorbing apparatus illustrated in FIG. 1($b$), depicting an exemplary way to assemble the various components of one embodiment of an energy absorbing apparatus, and a desired notch or spacing to add flexibility and decrease stiffness, between the base of the apparatus and a support member of a structure, for example a foundation of a building, in accordance with an exemplary embodiment of the present invention.

FIG. 4($d$) is a cross-sectional view of the energy absorbing apparatus depicted in FIGS. 4($a$)-($c$), illustrating its internal composition.

FIG. 5($a$) is an exploded view of an energy absorbing apparatus, such as a base isolator, displaying its various components and parts.

FIG. 5($b$) is an elevated plane view of a fully-assembled energy absorbing device, depicted in FIG. 5($a$).

DETAILED DESCRIPTION OF THE DRAWINGS

Figure 1A:
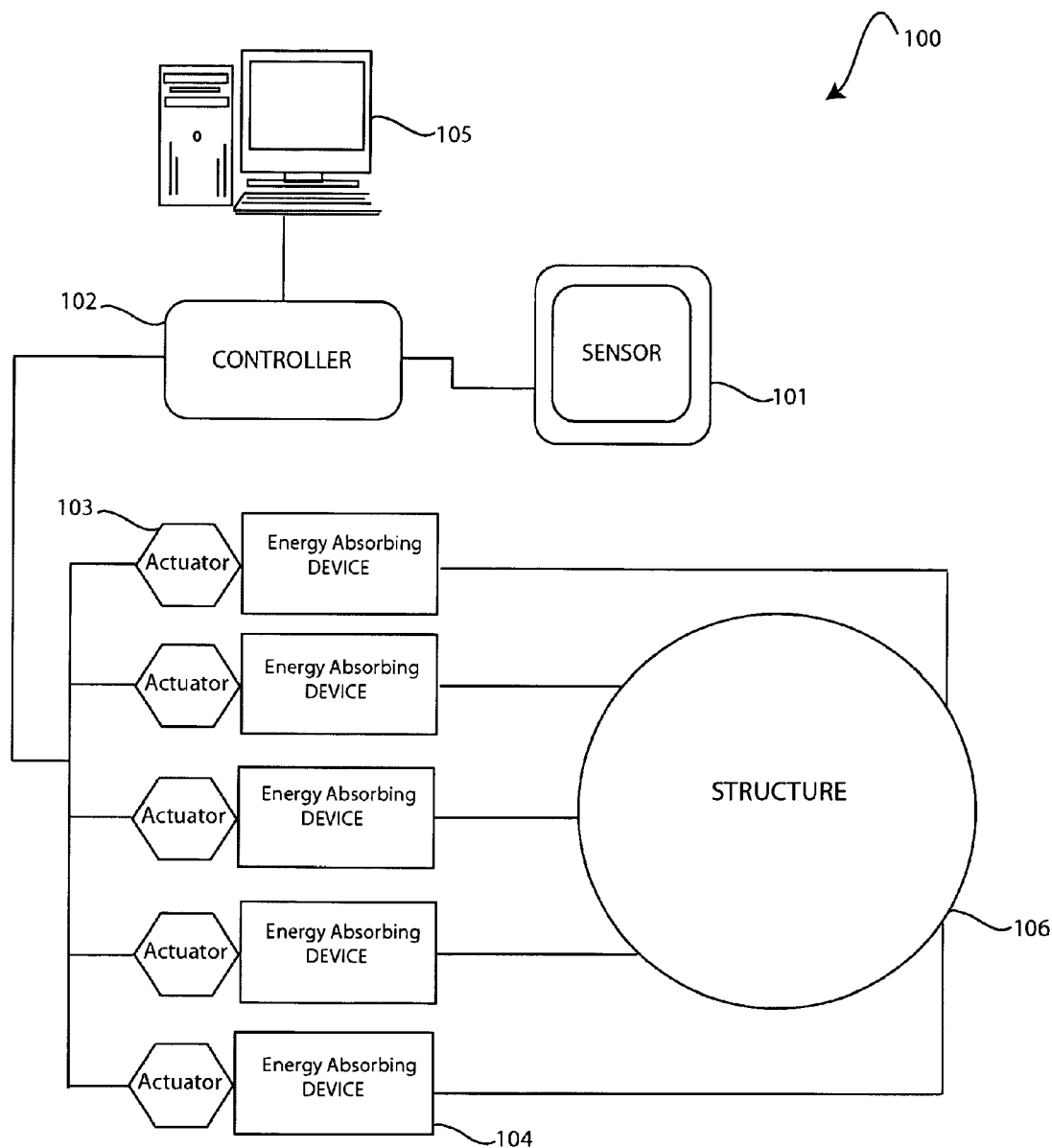
FIG. 1($a$) illustrates a block diagram of the system and method for adjusting a resonance frequency of an energy absorbing device attached to a structure, including a structure containing multiple energy absorbing devices, with multiple actuators adapted to the energy absorbing devices, a controller coupled to the actuators, and a sensor coupled to the controller, in accordance with one embodiment of the present invention.

In the following discussion that addresses a number of embodiments and applications of the present invention, reference is made to the accompanying drawings that form a part hereof, in which is shown by way of illustration specific embodiments in which the invention may be practiced. It is to be understood that other embodiments may be utilized and changes may be made without departing from the scope of the present invention.

The present disclosure teaches a system and method that utilizes a controller, coupled to one or more sensors, for example seismic sensors, configured to receive sensing data and process necessary information in order to generate and relay commands to one or more energy absorbing devices implemented into one or more structures. By coupling one or more actuators to each energy absorbing device, the controller is able to process and generate control signals, communicate with each actuator, and actuate any necessary components to make adjustments required by each energy absorbing device in order to decrease a disruptive response of a structure.

The calculations or determinations processed by the controller are communicated to each actuator coupled to corresponding energy absorbing devices, wherein any required tuning is therefore in response, or in anticipation, to the disruptive force, thereby constantly making adjustments and reconfiguring parameters for each energy absorbing device in order to alter or modify a critical structural state, for example the period or resonance frequency of a structure, during a disruptive event (e.g. an earthquake, high winds, or an explosion).

Furthermore, depending on the applications for which a system in accordance with the present invention may be implemented, it is understood that different configurations of the various elements may be employed without deviation or limiting the scope of the present invention. For example, the system and method disclosed herein may comprise of a controller, one or more sensors and: a single actuator coupled to a single energy absorbing device; multiple actuators to adjust or tune a single energy absorbing device; a single actuator for adjusting or tuning multiple energy absorbing devices; or multiple actuators to adjust or tune multiple energy absorbing devices.

It is understood that in the present disclosure, an automatic response energy absorbing system may be implemented with any device or system designed to absorb or dissipate energy from a disruptive force away from a structure. An automatic response, in accordance with the present invention, may comprise tuning an energy absorbing system in response to, or in anticipation of a disruptive force. Alternatively, an automatic response may also include a self adjustment performed by an automated system, or an automatic response generated from a user input.

Tuning, as defined in the present disclosure, may refer to a process of selecting appropriate genetic operators and their respective parameters to suit a problem; a process of changing the parameters of a device or a system to achieve a specified or improved performance; a process of establishing a desired frequency of a system; or a variety of adjustments, modifications, alterations, or calibration to optimize performance of an overall system.

An energy absorbing system may include without limitation, a passive energy control system, an active energy control system, a semi-active energy control system, a hybrid control system, or any other type of known energy control system directed at dissipating energy away from a structure or protecting structural integrity for a variety of applications, without deviating from the scope of the present invention.

Figure 1B:
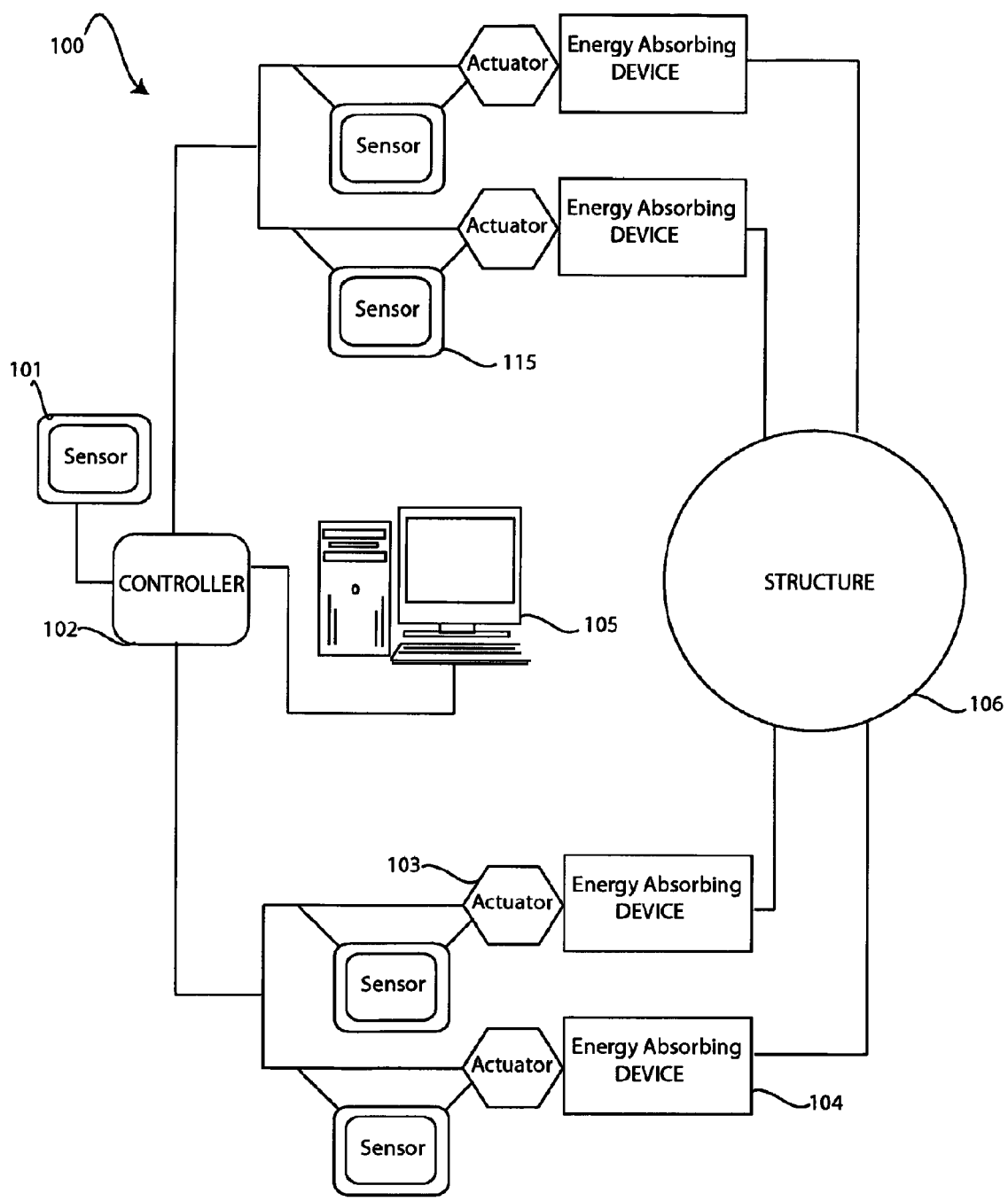

FIGS. 1(a) and 1(b) illustrate two embodiments of an automatic disruptive energy response system configured for tuning a plurality of energy absorbing devices 104, which may be coupled to one or more structures for dissipating a destructive force, or isolating one or more structures from a disruptive energy in order to preserve structural integrity.

Turning first to FIG. 1(a), system 100 comprises a plurality of energy absorbing devices 104 coupled to a plurality of actuators 103, which have been configured to receive commands or control signals from controller 102. System 100 further comprises sensor 101 for receiving sensing data pertaining to a disruptive force that may affect structure 106's integrity. It is that sensing data, along with structural information pertaining structure 106, which controller 102 processes in order to adjust each energy absorbing device coupled to structure 106.

Although it is understood that typically structure 106 may be a general building, structure 106 may alternatively comprise a variety of structures without limiting the scope of the present invention.

For example, and without deviating from the scope of the present invention, structure 106 may be a small office building, a warehouse, a family home, a sky scraper, a network of buildings within a city block, a parking structure, a recreational building, a stadium, an underground facility, an armored vehicle, any type of water retaining wall, a dam, a levee, a protective container for transporting sensitive materials, or any other type of structure for which an energy dissipation or base isolation system may be implemented in order to preserve structure 106's structural integrity and thereby protect any entities or products situated within and around structure 106 during a disruptive event.

Controller 102 may be any type of known controller or processor configured for executing known or proprietarily created formulas, equations or algorithms, which may be necessary to process or calculate required adjustments for tuning energy absorbing devices 104. A primary purpose for controller 102 is to process certain determinations based on known or unknown constants and variables. For example, and without limiting the scope of the present invention, controller 102 may process information pertaining to the natural period of structure 106, a default system resonance frequency for structure 106, or a magnitude of a disruptive force detected by sensor 101. Furthermore, it may be desirable for controller 102 to process any other information pertaining to system 100 such as the number of actuators within system 100, the number of energy absorbing devices 104 within system 100, a location wherein each device is coupled to structure 106, and possibly a number of structural components comprising structure 106 which may be managed by system 100.

Typically, controller 102 may have access to a database containing all relevant information pertaining to system 100. For example, and without limiting the scope of the present invention, such data may include the number of devices coupled to a structure, the configuration of energy devices 104, the number of actuators 103, structural components, or any other type of relevant information that controller 102 may require in processing and making relevant determinations whether during a disruptive event or during maintenance of system 100.

In one embodiment, controller 102 comprises a server with multiple computers in charge of various base isolation systems within one or more locations. This may be desirable to centralize a wide system which covers a number of structures. In another embodiment, controller 102 is a simple processor situated within a single structure which has been equipped with one or more energy absorbing devices 104 and actuators 103.

In yet another embodiment, controller 102 is a multi server system comprising a database of various locations capable of managing and administrating a variety of base isolation systems deployed throughout an entire city block (such desirable configuration for one embodiment of the present invention may be implemented as described in detail with reference to FIG. 1(b).

Typically, controller 102 may be monitored and controlled manually by an authorized user such as a system's manager or administrator knowledgeable in engineering and structural components of system 100. This may be achieved by implementing a monitoring device or user interface on which such authorized user may oversee, manage, and monitor system 100's specifications, parameters, capabilities or performance levels. In an exemplary embodiment, controller 102 is connected to user interface 105 as illustrated in FIG. 1(*a*) and (*b*).

User interface 105 may allow an authorized user such as a qualified engineer to access information necessary for calibrating actuators 103 or sensor 101. User interface 105 may allow users to update software and repair errors or damage that occur within controller 102 or anywhere throughout system 100. User interface 105 may be simple interface which allows data retrieval and data input, or may comprise a graphical user interface to facilitate human interaction with system 100 without deviating from the scope of the present invention.

In one embodiment, user interface 105 may be a local user interface locally connected to controller 102. In another embodiment, user interface 105 may further comprise a local interface in addition to a web-based graphical user interface, which may be accessed through a network interface from a remote location thereby allowing an authorize user to monitor, manage, maintain, update, or control system 100 via user input provided to controller 102.

Controller 102 is configured to receive sensory information from sensor 101, which has been configured to generate sensing data pertaining to a disruptive force's properties; for example and without limitation: a force magnitude, direction, or epicenter from which a disruptive force may have originated.

Sensor 101 may be any type of sensor known in the field which may be utilized to receive any sensing data pertaining to a disruptive force such as vibrations from seismic forces, vibrations from high winds, forces generated from the blast of an explosion, or any other type of disruptive force which may need processing by system 100, particularly in relation to structure 106.

Typically, sensor 101 is an instrument configured for recording motions of the ground, including those seismic waves generated by earthquakes, explosions, or other seismic sources. Additionally, depending on the applications of system 100, sensor 100 may be configured to detect ground vibrations resulting from oncoming vehicles such as armored trucks or military vehicles.

In one embodiment sensor 101 is a component forming part of an earthquake warning system further comprising of accelerometers, communication mediums, (i.e. to communicate with computers including controller 102), and alarms that are devised for regional notification of a substantial earthquake while its disruptive forces are in progress. Pre-existing high speed communications systems and computers which collect sensor readings may be implemented with system 100 so that controller 102 may be programmed to detect the likely strength and progression of for example, a seismic event.

In another embodiment, another variation of sensor 101 comprises a sub-system of electronic sensors, amplifiers, and recording instruments which are configured to communicate with controller 102. Typically, these components of sensor 101 are known instruments which are broadband in nature and cover a wide range of frequencies (i.e. some seismometers can measure motions with frequencies from 30 Hz (0.03 seconds per cycle) to 1/850 Hz (850 seconds per cycle), however implementing any type of sensor equipment with sensor 101 does not deviate from the scope of the present invention.

As way of example, other variations of sensor 101 may comprise use of known horizontal instruments, or known vertical instruments that use constant-force suspension. Alternatively, sensor 101 may employ modern instruments which use a "triaxial" design, in which there are three identical sensors to measure motion at the same angle to the vertical, but along directions 120 degrees apart.

In yet another embodiment, sensor 101 comprises a teleseismometer which can record a very broad range of frequencies.

Sensor 101 may comprise a single sensor connected to structure 106 itself, or may be located in a remote location. For example, and without deviating from the scope of the present invention, sensor 101 may comprise a network of sensors positioned in a manner so as to triangulate the origin and direction of a particular disruptive force approaching structure 106.

In an exemplary embodiment, sensor 101 may invoke a force accelerometer and be interconnected with other seismometers for precisely locating in three dimensions the source of a disruptive force.

Furthermore, sensor 101 may be an analog seismograph that requires analog recording equipment, possibly including an analog-to-digital converter. However, it may be desirable to implement sensor 101 with digital seismographs that simply plug in to controller 102 to present any sensing data in standard digital forms—making communication between sensor 101 and controller 102 less complex, more accurate, and more efficient. All these alternative sensor configurations and sensor components and methods are known and may be implemented in system 100 without deviating from the scope of the present invention.

The sensing data retrieved by sensor 101 must ultimately be processed and calculated in order for controller 102 to communicate any determinations or control signals generated from said sensor data on to one or more actuators 103 in system 100. These actuators become the arms and legs for controller 102 to be able to tune (i.e. activate, adjust, or calibrate) each individual energy absorbing device 104.

In the present disclosure, an actuator may be, without limitation: any apparatus or device, whether electric, magnetic, or mechanical, for moving or controlling a mechanism, apparatus, instrument, or system. An actuator in the present disclosure may be utilized to introduce motion, or to clamp an object or component so as to prevent motion, or may be any device which transform an input signal (i.e. an electrical signal from controller 102) into motion.

For example, and without limiting the scope of the present invention, actuators 103 may comprise of motors, pneumatic actuators, hydraulic pistons, relays, linear actuators, electric actuators, rotary actuators, yoke actuators, rack and pinion actuators, or any other type of actuator which may be implemented with an energy absorbing device in accordance with the present invention.

Actuators 103 may therefore be any type of known actuators which can handle several types of functions to adjust, calibrate, activate, or modify parameters of any one of the multiple energy absorbing devices 104. In an exemplary embodiment, a rotary actuator may be used particularly when circular motions are needed (see FIG. 4(*a*)-(*c*) below) to adjust or tune energy absorbing devices 104 in response or in anticipation of a disruptive event.

Actuators 103 may be coupled to a single energy absorbing device, or multiple devices depending on the nature of structure 106, but most importantly, actuators 103's configuration in relation to energy absorbing devices 104 may depend primarily on the kinds of components and designs that make up energy absorbing devices 104.

Energy absorbing devices 103 may comprise seismic isolation devices or energy dissipation devices depending on the nature of structure 106. Furthermore, energy absorbing devices 104 may comprise multiple types of energy absorbing techniques (i.e. energy dissipation or base isolation). For example and without deviating from the scope of the present invention, energy absorbing devices 104 may include base isolators placed at a base of structure 106 to decouple structure 106 from damaging properties of a disruptive force, so as to prevent structure 106's superstructure from absorbing the disruptive energy in addition to providing substantive damping. Furthermore energy absorbing devices 104 may include energy dissipation devices placed within frames or walls of structure 106 to provide supplemental viscous damping or hysteretic damping in order to significantly reduce a structural response to the motions from the disruptive force.

Therefore, energy absorbing devices 104 may include a variety of devices to help isolate and dissipate energy away from structure 106, including but not limited to general base isolators, flexural beam devices, lead-rubber devices, lead extrusion devices, flexural plate devices, torsional beam devices, viscoelastic dampers, hydraulic devices, friction-slip devices, metallic yielding devices, shape-memory alloy devices, or any other type of devices capable of aiding in the isolation, absorption, or dissipation of a large portion of a disruptive energy through any means such as inelastic deformations or friction concentrated in the energy absorbing devices, thereby protecting structure 106 from damage.

In an exemplary embodiment, structure 106 comprises a building and energy absorbing devices 104 are primarily base isolators which may be tuned by actuators 103 upon command from controller 102. For example, and in no way limiting the scope of the present invention, during an earthquake, and in response to control signals generated by controller 102, energy absorbing devices 104 are calibrated or tuned by actuators 103 to increase the natural period of the overall structure 106, thereby decreasing the acceleration response of structure 106. Since the natural frequency of structure 106 is dominated by the natural frequency of the isolator, controller 102 must evaluate (through processing any sensor data received from sensor 101) the effective or equivalent stiffness and damping ration for each and every one of energy absorbing devices 104; notably, any damping generated by energy absorbing devices 104 will further decrease structure 106's acceleration response, thus a desirable feature to be implemented with every one of energy absorbing devices 104 utilized with system 100.

By implementing one or more actuators 103 with any type of the above mentioned energy absorbing devices 104, controller 102 may modify, calibrate, adjust or tune each device to properly respond to a disruptive event by means of communicating any generated signals to one or more actuators 103 coupled to energy absorbing devices 104.

Typically, as in the illustrated embodiment, the entire set of energy absorbing devices 104 and actuators 103 communicate with controller 102 via any type of known communication methods without deviating from the scope of the present invention. In one embodiment, controller 102 communicates with actuators 103 via a wired system. In another embodiment, controller 102 communicates with actuators 103 via a wireless network. And in yet another embodiment, actuators 103 communicate with each other via a wired network and send and receive any information regarding energy absorbing devices 104 to and from controller 102 utilizing a wireless network bridge.

Referring briefly to FIG. 1(b), another embodiment utilizing the same components is illustrated by way of example. The illustrated embodiment comprises of multiple sensors 115 which are utilized in order to retrieve sensing data more specifically related to a particular location wherein each of a plurality of energy absorbing devices 104 has been implemented into structure 106. Since a disruptive force may affect different components of structure 106 with varying levels of force and in varying directions, implementing localized sensors 115 may be a desirable configuration to gather data about a particular location of structure 106 with greater accuracy.

For example, and without deviating from the scope of the present invention, different materials may be utilized in some sections or portions of structure 106, thus a disruptive force may affect distinct areas of structure 106 with variable forces, sensors 115 may gather data and send such data to controller 102 so that energy absorbing devices 104 may be tuned in accordance with the force being asserted to that particular section or portion of structure 106.

FIG. 2 illustrates a simple chart depicting a response spectra of a structure retrofitted with energy absorbing devices. Energy absorbing devices such as base isolators, help in reducing disruptive forces by changing the structure's fundamental period to avoid resonance with the predominant frequency contents of the disrupted forces.

A controller in accordance with the present invention (such as controller 101) may be configured to tune, adjust, or calibrate each energy absorbing device coupled within a structure to change the period of the structure accordingly in response or in anticipation of a disruptive event. A disruptive event may be strong winds, an earthquake, an explosion, or a surge of water directed towards a structure.

FIG. 2 is a simple graphical representation of basic principles well known and understood by those skilled in the art. Therefore the present disclosure will not be directed to explaining the various complex calculations and determinations required for controller 101 to process when generating control signals in tuning energy devices in accordance with the present invention.

However, in one embodiment and by way of example, controller 101 may process the effective period of structure 106 using a known formula shown below to determine the effective period. The effective period of the isolated structure 106, $T_D$, may be determined using the deformational characteristics of the isolation system used, in accordance with the equation shown:

$$T_D = 2\pi \sqrt{\frac{W}{k_{Dmin} g}} \quad (1)$$

where:

W is total seismic dead load weight of the structure above the isolation interface (kip or kN), $k_{Dmin}$ is the minimum effective stiffness, in kips/inch (kN/mm), of the isolation system at the design displacement in the horizontal direction under consideration, g is the acceleration of gravity, and the units of the acceleration of gravity, g, are in./sec$^2$ (mm/sec$^2$) if the units of the design displacement, $D_D$, are in inches (mm).

Similar known methods may also be processed by controller 102 to determine structure 106's effective period at a maximum displacement. The effective period of such isolated structure 106 at a maximum displacement, $T_M$, may be determined using the deformational characteristics of the isolation system in accordance with the following equation:

$$T_M = 2\pi \sqrt{\frac{W}{k_{Mmin} g}} \quad (2)$$

where:

W is the total seismic dead load weight of the structure above the isolation interface, $k_{Mmin}$ is the minimum effective stiffness, in kips/inch (kN/mm), of the isolation system at the maximum displacement in the horizontal direction under consideration, and g is the acceleration due to gravity. The units of the acceleration of gravity, g, are in./sec$^2$ (mm/sec$^2$) if the units of the design displacement, $D_D$, are inches (mm).

Again, these are known methods of processing or calculating the necessary variables system 100 may require in order to tune energy absorbing devices 104. It is understood that other methods and formulas which are well known to one of ordinary skill in the art, may be made available and implemented with system 100 so that controller 102, through the use of equations, algorithms, or formulas, may tune each device in response or in anticipation of a disruptive event, or during routine maintenance of system 100.

In another embodiment, for example wherein structure 106 comprises a building, controller 102 may further take into account the number of floors that make up structure 106. Since damage to buildings during seismic forces is most likely to occur when the shaking frequency of the ground matches the shaking frequency of the building, controller 102 may use such structural information to determine at what frequency structure 106 will be most susceptible to damage and tune energy absorbing devices accordingly. For example, and without deviating from the scope of the present invention, the following table illustrates the general principal that a building's frequency is about 10 Hz (vibrations per second) divided by the number of floors. Controller 102 may therefore utilize this information to determine at which frequency structure 106 may be most sensitive to, for example, a seismic force.

TABLE 1

| Number of Floors | Frequency (Hz) | Period (seconds) |
|---|---|---|
| 1 | 10.0 | 0.1 |
| 2 | 5.0 | 0.2 |
| 5 | 2.0 | 0.5 |
| 10 | 1.0 | 1.0 |
| 30 | 0.3 | 3.3 |
| 100 | 0.1 | 10.0 |

FIG. 3(a) and FIG. 3(b) illustrate an exemplary configuration for placement of various energy absorbing devices coupled to actuators in accordance with one embodiment of the present invention. More specifically, FIG. 3(a) is a diagram representing a top view of a structure's support beams or frame and FIG. 3(b) is a diagram representing a side view thereof, wherein the structure rests on several energy absorbing devices coupled to actuators, for example base isolators coupled to actuator units, over the structure's foundation, and wherein the structure's superstructure is suspended or isolated from the ground and foundation. Although this represents a typical configuration for placement of energy absorbing devices within a structure, actuators and sensors have been implemented to improve the overall system in accordance with one exemplary embodiment of the present invention.

Typically, support beams (or comparable structural components) of superstructure 301 are adapted with various energy absorbing devices—in this case, various base isolators 302, 303, 304, and 305 (and corresponding actuators 302a, 303a, 304a, and 305a), which have been coupled in a manner so that structure 300's superstructure 301 is suspended or isolated from foundation 306.

While placement of base isolators 302, 303, 304 and 305 will depend on the particular requirements of structure 300, typically base isolators 302, 303, 304 and 305 will be implemented between foundation 306 and superstructure 301. Furthermore, other energy absorbing devices may be implemented throughout structure 300. For example, FIG. 3 (b) illustrates a diagram of a side view of structure 300 wherein vertical beams, or support beams 308, further make up superstructure 301 of structure 300. Support beams 308 are retrofitted with energy absorbing devices 307 coupled to actuators 307a in a manner so that energy absorbing devices 307 may minimize an acceleration response, dissipate a disruptive energy, alter an overall period of structure 300, or provide any other function that will further preserve structure 300's structural integrity during a disruptive event.

A sensor and control system 310 is adapted to communicate with actuators 302a, 303a, 304a, 305a, and 307a via a communication link 309. Communication link 307 may be a conduit carrying wires for power and communication, or may be a wireless network that is able to transmit information between each device and system 310.

Placement of actuators 307a for energy absorbing devices 307 or actuators 302a, 303a, 304a, and 305a for base isolators 302, 303, 304 and 305 assure an automatic tuning of the various devices in response or in anticipation of a disruptive force directed towards structure 300.

If the magnitude of a disruptive force occurs with greater force on one end of structure 300 where, for example, base isolators 304 and 305 are in place, the resonance frequency of structure 300 resulting from the disruptive force may be offset by the tuning only those devices. Thus, control signals to base isolators 302 and 303 may differ than control signals sent to base isolators 304 and 305 to compensate for the direction of the path of the incoming disruptive force.

Similarly, if the magnitude of a disruptive force affects structure 300 equilaterally throughout structure 300, all base isolators 302, 303, 304, and 305 may be tuned equally in order to offset the constant disruptive resonance frequency applied to structure 300.

FIG. 4(a)-FIG. 4(d) illustrate an exemplary embodiment of a base isolator, which may be installed within a structure, for example between the floor and foundation of a building, adapted for tuning by implementing actuators coupled to one or more components of the base isolator.

Figure 4A:
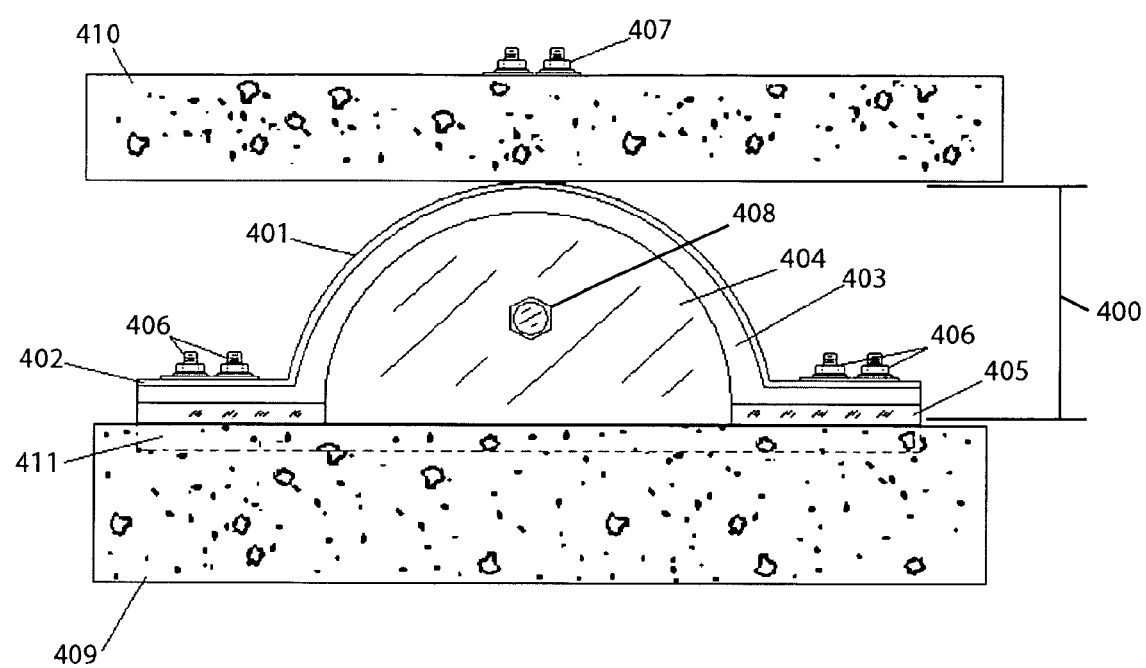
FIG. 4($a$) is a front view of an energy absorbing apparatus installed within a structure, for example between the floor and foundation of a building, in accordance with one embodiment of the present invention.
Figure 4D:
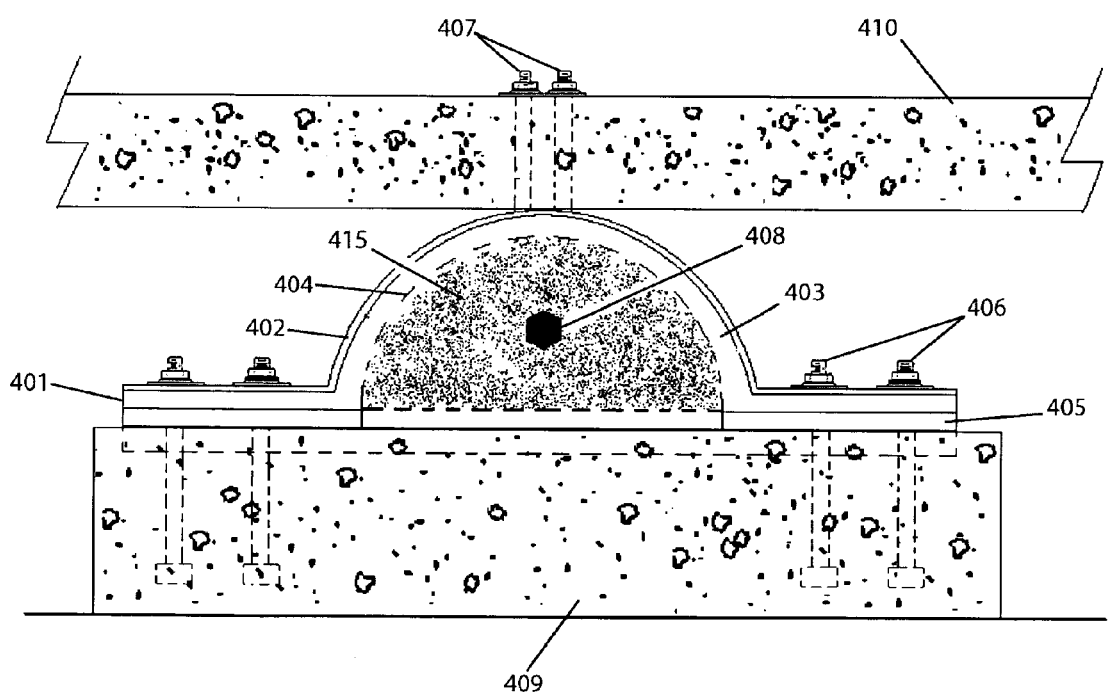

FIG. 4(a) is a front view of base isolator 400 installed within a structure; FIG. 4(b) is a side view thereof, further illustrating one alternative installation feature which makes use of spacing 411 to minimize stiffness to the apparatus perpendicular to the direction of loading; FIG. 4(c) is a close-up view of a lower right portion of base isolator 400 illustrated in FIG. 4(b), depicting an exemplary way to assemble the various components thereof, and a more detailed illustration of a desired notch or spacing 411 to add flexibility and decrease stiffness, between the base of the device and a support member of a structure; and FIG. 4(d) is a cross-sectional view thereof, illustrating the internal composition of base isolator 400 in accordance with the present invention. One or more actuators may be couple to components of base isolator 400 in order to tune base isolator 400 for optimizing its energy absorbing properties when coupled to a structure.

Base isolator 400, illustrated in FIGS. 4(a)-4(d), comprises of an energy absorbing material 415 (visible in FIG. 4(d) only), cover component 401, layer 402, layer 403, side plates 404, base 405, multiple bolts 406, multiple bolts 407, and a center bolt 408. In the illustrated embodiment, the apparatus is coupled or attached to a structural component 409, and a structural component 410. These individual components and their possible variations will be discussed in turn, particularly with respect to how some components may be tuned, calibrated or adjusted an automatic disruptive force response system in accordance with the present invention, for example, system 100 described above.

Implementing base isolator 400 with an automatic response system such as system 100, typically comprises coupling actuators in a manner so that critical energy absorbing properties of base isolator 400 may be optimized—one such energy absorbing property central to the composition and performance of base isolator 400, is the energy absorbing material enclosed within base isolator 400.

Energy absorbing material 415 may be any type of energy absorbing material such as filler made of granular elements, for example sand, crushed rocks, specially shaped rocks, or liquid substances, without departing from the scope of the present invention. In one embodiment, energy absorbing material 415 is made from a granular fill that provides friction in concert with cover component 401 and its layers 402 and 403. This friction produces a desired dampening to reduce the vibrations caused by disruptive forces, for example, seismic forces or the force of an explosion.

An actuator configured to control, adjusts, or tune base isolator 400, may calibrate cover component 401 so as to tune the frictional properties which generate the desired damping. For example, and without deviating from the scope of the present invention, an actuator may be configured and coupled in a manner so as to pressurize or depressurize cover component 401 in order to alter energy absorbing material 415's displacement, thereby altering energy absorbing material 415's interactive forces in concert with cover 401 and its layers 402 and 403. In an exemplary embodiment, this may be accomplished for example, by compression actuators configured for compressing or depressing side plates 404.

In another embodiment, energy absorbing material 400 comprises a liquid mixture (which may further comprise other components such as oil, without deviating from the scope of the present invention). In such embodiment, cover component 401 may further comprise of a spring-loaded chamber (not illustrated), without departing from the scope of the present invention. A chamber spring within said chamber (not illustrated) may be utilized to push back displaced energy absorbing material 415, which has been displaced by a disruptive force, back into the cavity or enclosure where energy absorbing material 415 (e.g. a liquid or oil mixture) is contained during a resting state of the energy absorbing device.

In such embodiment, an actuator may help control the mechanics of the spring-loaded chamber so as to properly calibrate a desired stiffness of cover component 401 by introducing or removing a desired amount of energy absorbing material 415 in and out of said chamber. For example and without deviating from the scope of the present invention, a hydraulic actuator may even replace a spring mechanism to control a pressure of said chamber and said enclosure formed by cover component 401.

Cover component 401 envelopes or contains energy absorbing material 400 by creating a cavity or enclosure between cover component 401 and base 405. Cover component 401 is illustrated comprising of multiple layers (i.e. layer 402, and layer 403) however, cover component 401 may be constructed of a single layer, two layers, or multiple layers, without deviating from the scope of the present invention.

In an exemplary embodiment, cover component 401 comprises of multiple layers 402 and 403, wherein one layer comprises of a rigid material and the other layer comprises of a resilient material, for example, and without deviating from the scope of the present invention, a resilient material such as rubber and a rigid material such as steel, may be embedded within cover component 401 for additional strength. Furthermore, a layer of a rigid material, for example steel, can be folded to release at a specific force level, a feature that may be desirable for some applications of an energy absorbing apparatus in accordance with the present invention.

Cover component 401 may be constructed of one material, a mixture of materials, or may be constructed of multiple layers of different materials bounded, or bonded, together to form cover component 401. For example, cover component 401 may be constructed of rubber or neoprene materials, or a mixture of both, without deviating from the scope of the present invention.

In an exemplary embodiment, cover component 401 comprises of a rigid layer and a resilient layer, (i.e. layers 402 and 403), wherein each layer is further reinforced with an additional material (e.g. nylon). For example, and without limiting the scope of the present invention, layer 402 comprises of steel sheet and nylon reinforcements and layer 403 comprises of rubber; the sheet steel and nylon being bonded to the rubber layer to form cover component 401.

Layers 402 and 403 may be bonded in any configuration; each layer of different materials may be bonded on the sides surrounding the rubber material, on top of the rubber material, or in any configuration, to bond the steel, nylon and rubber that comprise cover component 401. Furthermore, the thickness of layers 402 and 403 may vary depending on their respective materials. For example, and without deviating from the scope of the present invention, the thickness of steel and nylon reinforcements will vary to provide different material properties depending on the intended application (i.e. building reinforcements, military structures, or implementing an energy absorbing system for special cargo).

Cover component 401 is typically semicircular in shape (as illustrated); this shape is desired because of its strength and flexibility properties, however, cover component 401 may be shaped in a variety of forms—depending on the intended application for such energy absorbing device—without deviating from the scope of the present invention.

In one embodiment cover component 401 is triangular in shape; in another embodiment cover component 401 is circular in shape; in yet another embodiment cover component 401 is shaped like a square (with flat surfaces creating the cavity which houses energy absorbing material 415); Finally, in an embodiment utilizing a resilient component such as a rubber material, the rubber itself may be rectangular, u-shaped, or box-shaped.

Actuators may be configured in a manner so as to change the height of cover component 401 without altering base isolator 400's width. This calibration may be desirable in the event a vertically oriented force is exerted on a structure to which base isolator 400 is connected to. For example, and without deviating from the scope of the present invention, actuators may be placed between structural component 410 and cover 401 on either side of base isolator 400 to adjust or alter cover component 401's height without significantly altering side plates 404; naturally, energy absorbing device 415 must be of such composition and configured in a manner so as to allow for such alterations or calibrations of base isolator 400.

In each of the aforementioned embodiments, layers 402 and 403 of cover component 401 may vary in specification (dimensions, weight, thickness, flexibility, etc.) depending on the material properties required to resist a desired magnitude of force—the thickness of steel and nylon reinforcement for example, may vary, depending on the desired material properties necessary to properly restrain displacement of cover component 401.

Naturally, such properties will relate to parameter dependent factors, such as stiffness, damping ratio, or bearing displacement desired for a particular application of the present invention; such measurements and dimensions may be easily calculated with known methods and formulas—formulas and calculations that are presently well known to one skilled in the art.

By configuring one or more controllers, such as controller 102, to process such relevant parameter-dependent factors, including stiffness, damping ratio, or bearing displacement desired for a particular application of the present invention, such measurements and dimensions may be easily calculated so that one or more controllers may tune base isolator 400 via the implemented actuators.

Actuators may also be configured to adjust base isolator 400's width. Side plates 404 are ideally made of steel, although other known materials may be utilized, and sandwich cover component 401 in a manner so as to add frictional forces with base 405 and help generate damping forces in response to a disruptive force. An actuator configured to clamp side plates 404 may alter the width of cover component 401 and tune said generation of damping forces.

In an exemplary embodiment however, a more desirable configuration may comprise connecting an actuator to center bolt 408 in a manner so as to tune base isolator 400 (i.e. to alter a resonance frequency of base isolator 400) without the need for multiple actuators.

Center bolt 408 is perpendicular to and positioned between side plates 404, running through the cavity containing energy material 400. Thus, the rigidity and displacement capability of energy absorbing material 415 may be adjusted by tightening or loosening center bolt 408; as center bolt 408 is tightened, for example, side plates 404 are brought closer to create a smaller cavity, which is desirable to control the dampening capabilities of the energy absorbing device. Center bolt 408, along with bolts 406 and 407, help to transfer tension and shear forces away from the structure. Center bolt 408 may be a typical bolt, a clamping device or any other type of device known in the art that can be utilized to connect side plates 404. Typically, and perhaps more desirable, center bolt 408 is a typical bolt that is inexpensive yet made of durable strong material, and several known types of actuators may easily be implemented to interface with bolt 408.

Cover component 401, and (if embodied), side plates 404, are configured to connect with a base 405 which also helps to transfer forces into the foundation and away from the remainder of the structure. While cover component 401 may be manufactured or molded or constructed in such manner as to create a cavity suitable for containment of energy absorbing material 415, cover component 401 may also be configured to rest or be connected with base 405 in such a matter so that base 405 completes the desired enclosure or cavity in which energy absorbing material 400 will be contained, without deviating from the scope of the present invention. Implementation of actuators thus depends on the configuration of the components of a base isolator or energy absorbing device.

For example, cover component 401 comprises of layers 402 and 403, which have respective ends configured to attach to base 405 with multiple bolts 406. Multiple bolts 406 may also be coupled to one or more actuators to adjust, calibrate or tune a desired transfer of forces away from a structure to which base isolator 400 is connected to.

Multiple bolts 406 need not be limited to more than one bolt, and multiple bolts are not the only method of connecting cover component 401 to base 405; any other known method may be utilized without deviating from the scope of the present invention. For example, bonding agents may be utilized, or clamp devices may be utilized which can be adjustable depending on the desired settings of the device. Typically, multiple bolts 406 are regular adjustable bolts that can be mounted on a structure to connect cover component 401 and base 405 to a structural component of some structure, such as structure component 409, and may be more desirable than a clamp device because of practical and economical considerations.

Similarly, multiple bolts 407 may also be utilized to connect cover component 401, to a structural component 410. Multiple bolts 407 may alternatively comprise a single bolt, a clamping device, or some type of bonding agent capable of securely connecting cover component 401 to a structure, but again, multiple bolts 407 may be more desirable than a clamp device because of practical and economical reasons; furthermore, a bonding agent may not be as effective as transferring forces away from the structure.

Again, coupling multiple actuators to components such as multiple bolts 406, multiple bolts 407, or center bolt 408, may depend on the desired configuration of base isolator 400 and on the application for which base isolator 400 may be utilized as an energy absorbing device. For example, and without limiting the scope of the present invention, base isolator 400 may be coupled to a retaining wall, a foundation for a building, components for an armored vehicle, or any other application which may require energy absorbing properties provided by base isolator 400. Thus, structural components 409 and 410 may be any parts or components of a structure wherein an energy absorbing device may be mounted, such as a frame or a support member of a structure.

Typically however, structural component 409 may be the foundation of a building and structural component 410 may be a frame or floor of said building.

FIG. 4(b) is a side view of an energy absorbing apparatus installed within a structure, for example between the floor and foundation of a building. FIG. 4(b) illustrates how side plates 404 may sandwich, retain, restrain, or contain cover component 401. From this perspective, layers 402 and 403 of cover component 401 are also visible at the top and bottom of the energy absorbing apparatus, where cover component 401 is coupled or attached to the structure with multiple bolts 407 and 406, respectively. Furthermore, one alternative installation feature which makes use of a spacing 411 to minimize stiffness to the apparatus perpendicular to the direction of loading is illustrated in this view. This spacing allows for movement to occur when a disruptive force is applied to an energy absorbing apparatus in a direction parallel to center bolt 408. How a structure is affected to such disruptive forces is further disclose in reference to FIG. 7, disclosing a different installation configuration for a base isolator such as base isolator 400 in accordance with the present invention.

FIG. 4(c) is a close-up view of a lower right portion of the energy absorbing apparatus illustrated in FIG. 4(b), depicting an exemplary way to assemble the various components of one embodiment of an energy absorbing apparatus, and a close-up of a desired notch or spacing 411 to add flexibility and decrease stiffness, between base 405 and a support member of a structure, for example structural component 409.

Spacing 411 is an alternative to various methods of achieving the desired flexibility. Typically, the stiffness of the energy absorbing apparatus, perpendicular to the direction of the loading, is minimal. In other words, a force applied in a direction perpendicular to side plate 404, for example, may cause side plate 404 to move sideways; in such event, spacing 411, as illustrated in FIG. 4(c), will allow for this movement to occur smoothly, thus transferring forces away from the structure and deviating stress from base 405 and side plates 404. Similarly, such spacing may be desirable at the top of the device where layers 402 and 403 make contact.

Nevertheless, spacing 411 is merely an alternative feature and other known methods of providing such flexibility may be employed without deviating from the scope of the present invention, for example, other resilient materials with a flexible property may be used in place of spacing 411; alternatively, spacing 411 may not be utilized at all but the stiffness or lack thereof of an energy absorbing apparatus may be accomplished simply by a particular composition of flexible materials used in the device's construction. Thus, spacing 411 may or may not be implemented without deviating from the scope of the present invention.

For example, whether spacing 411 is utilized in the apparatus's installation or not, the stiffness, flexibility or desired characteristics of the device may be altered depending on the manner in which the various components are coupled, attached, or bonded together.

FIG. 4(c) also shows a typical way of bonding side plates 404 to base 405. In one embodiment, some bonding method or bonding component 412 may be applied to both base 405 and side plates 404, such as spot welding, to ensure a strong link between the two components allowing the device to resist a disruptive force from breaking off side plates 404. In another embodiment, a weaker bond may be used as bonding component 412 to allow side plates 404 to break off easily, transferring a disruptive force away from the structure. Thus, depending on the desired application, various types of bonding methods and materials may be used, or different installation configurations may be employed to provide a particular range of motion, flexibility or level of stiffness, for an energy absorbing device in accordance with the present invention.

As mentioned above, several embodiments are disclosed wherein base isolator 400 may be coupled to one or more actuators to drive multiple bolts 406, multiple bolts 407, or adjust center bolt 408. This tuning of base isolator 400 may allow for different ranges of motion, flexibility or level of stiffness, depending on the disruptive force to which a structure may be subjected to. In yet another embodiment, an actuator may be implemented to calibrate or tune a level of flexibility or stiffness provided by spacing 411 by replacing space 411 with, for example, a hydraulic actuator. An actuator in spacing 411 of base isolator 400 may be able to better respond to a force applied in a direction perpendicular to side plate 404, thereby allowing for this movement to occur smoothly, thus transferring forces away from the structure and deviating stress from base 405 and side plates 404. Similarly, such actuator may be desirable at the top of the device where layers 402 and 403 make contact.

Again, by implementing one or more actuators to base isolator 400, properties such as stiffness, damping ratio, or bearing displacement, may be altered or calibrated in response to a disruptive force; such measurements and parameters for base isolator 400 may be easily calculated with known methods and formulas—formulas and calculations that are presently well known to one skilled in the art, such as those discussed above in relation to controller 102.

The actuators that may be implemented are easily adaptable to fit or interface with base isolator 400 due to the simple nature of each of base isolator 400's components. Because each component of such embodiment for an energy absorbing device is readily available and commonly known in the hardware industry (perhaps with the exception of the particular energy absorbing material one may desire to implement) the actuators to be implemented with a base isolator in accordance with an exemplary embodiment of the present invention may easily be configured to interface with the isolator's various components. FIG. 5(a) and FIG. 5(b), illustrate a more detailed example of an embodiment of such isolator to which known actuators may either be directly implemented or easily modified to interface with one or more components.

FIG. 5(a) is an exploded view of an energy absorbing apparatus, displaying its various components and parts. FIG. 5(b) is an elevated plane view of the same, fully-assembled, energy absorbing device.

In accordance with an exemplary embodiment of the present invention, a base isolator that may be used with the automatic response system described in the present disclosure is illustrated, to which actuators may easily be implemented to interface with its various components.

In the embodiment illustrated in FIG. 5(a)-(b), cover component 500 comprises of layers 520 and 530. Typically, layer 520 is a rigid material, for example sheet steel, and may be a single layer or multiple layers bonded to layer 530, typically a resilient material such as rubber. However, as previously mentioned, layers 520 and 530 may be bonded or coupled in different configurations and may comprise different materials. Nevertheless, a rigid material against a resilient material do add a desired force which helps limit the displacement of the device and thus such configuration of components, that achieves a desired limited displacement, may be preferred to other configurations.

Cover component 500 is shown here with side reinforcements, or respective ends 505, which allow for cover component 500 to be coupled with base 501 and a structural component such as a foundation by connecting each component with typical bolts 504 and typical fasteners 506. Actuators may constantly adjust bolts 504 so that (for example, after an earthquake) the unit is securely attached to its respective structural component.

Similarly, typical bolts 502 and fasteners 503 are utilized to connect cover 500 to a second structural component such as the frame of a superstructure. Actuators may adjust bolts 502 accordingly during a disruptive event, or during maintenance.

The cavity or enclosure created between cover component 500 and base 501 can be filled with any type of material that has an energy absorbing property (as discussed above) such as a granular fill, a liquid, an oil based mixture, crushed sand, or any other type of energy absorbing material that may be displaced upon impact or subjection to a disruptive force.

To fully envelope the enclosure between cover component 500 and base 501, side plates 508 are connected to both cover component 500 and base 501; as explained above, this coupling may be performed by utilizing a bonding agent, welding or any other type of method known in the art. Here, bolt 510 is utilized to connect side plates 508, sandwiching cover component 500 and creating a frictional force against the energy absorbing material (not shown) inside the cavity formed thereof. Again, as explained above, bolt 510 may be adjusted to create the right friction for the desired damping effect of the device. An actuator may be able to add or decrease a pressure inside said cavity in order to achieve the desired displacement in response, or in anticipation, to a disruptive force.

Figure 6:
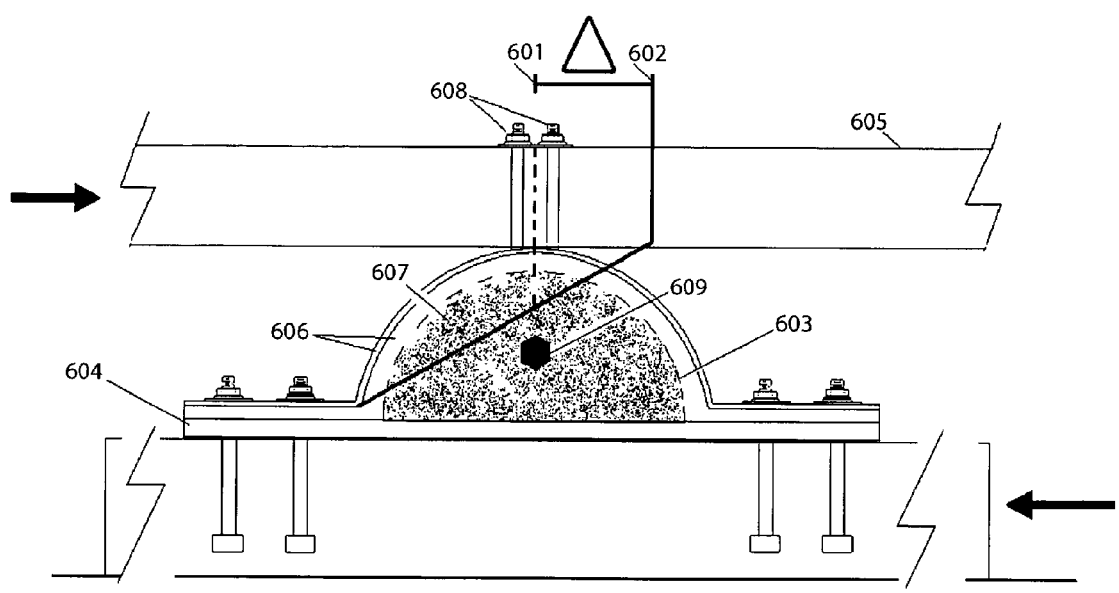
FIG. 6 displays a directional displacement effect on one embodiment of a base isolator in accordance with the present invention, as disruptive forces are applied, for example seismic forces.

Having disclosed the various components of an exemplary embodiment of a base isolator for use with the present invention, we now turn to FIG. 6 for an illustration of the workings of such base isolator described herein.

In particular, FIG. 6 displays a directional displacement effect on one embodiment of a base isolator for implementation with an automatic disruptive-force response system, as disruptive forces are applied; for example seismic forces generated during an earthquake.

As the illustration shows, the energy absorbing device provides a load path between the ground and the structure. A disruptive force, such as an impact force, an explosive force, or a seismic force, causes the apparatus to displace, moving from point 601 to point 602 and creating a displacement.

The displacement is directional in that displacement is parallel to the side plates 603 of the apparatus. Therefore, if the ground moves horizontal, parallel to side plates 603, base plate 604 moves with the ground while the base member 605, (e.g. a superstructure) stays still or moves in an opposite direction enough to absorb the disruptive force. This movement, or displacement, causes the cover component 606 to displace, since it is flexible in nature. Inside, the energy absorbing material 607, for example a granular material, will also be displaced.

It is this displacement property that allows the ground to move independent from the structure. For example, and without limiting the scope of the present invention, when an energy absorbing apparatus is connected to the foundation of a structure, the superstructure (that is, the structure built above the foundation) will move independently from the foundation of the structure due to the displacement of the energy absorbing device. Sensor data sent to actuators coupled to such apparatus will enhance the effectiveness of an energy absorbing device by constantly tuning the device during the disruptive event.

Another feature that helps reduce damage to such structure, for example a building, is the dampening properties of such energy absorbing device. In the exemplary embodiment of a base isolator in accordance with the present invention, the dampening properties are created by the friction between the rubber of cover component 606, side plates 603, and energy absorbing material 607; as friction is created, the device absorbs the energy from the disruptive force; meanwhile, actuators are constantly (as required and determined by a central controller or processor) tuning the device for maximizing energy dissipation and or absorption.

Furthermore, a controller coupled to such base isolator, may compensate or take into account any of the limitations that come from the materials as far as displacement and dampening capabilities; these thresholds and specifications can be calculated by such controller with known methods, as discussed above.

Other limitations include the following: the rubber is limited in displacement by the steel sheet—the steel sheet will displace until some limit, at which point the components will simply restrain movement. Obviously this is desired to prevent the collapse of a structure and maintain structural integrity. Again, these limitations can be calculated with known methods in the art, and thus controller tuning via actuators may substantially compensate for such limitations.

Typically, under static conditions, the weight of the structure is carried by the sheet steel and rubber components that make up the base isolator, including the filler material. Under displacement, the filler material will still support the vertical load of the structure. Finally, the elastic properties of the components (i.e. rubber, steel sheets, and filler material), in addition to tuning by one or more coupled actuators, will restore the apparatus to its initial shape or a desired shape, effective against or in anticipation of an exerted force.

While the disclosed system and method serves to detect disruptive forces and calculate an adjusted value in order to tune an energy absorbing device coupled or attached to a structure, the sensor and controller can be calibrated to operate at a minimum threshold level for detecting a disruptive force.

For example, if a structure is located in a densely populated and busy area, the sensor and/or controller may be calibrated to be more or less sensitive to disruptive forces (e.g. nominal vibrations) around such structure. Setting different levels of sensitivity for the sensor and controller system may be a desirable feature to avoid responses to negligible forces. Additionally, civil and structural engineers may find this system and method useful for monitoring the problems and issues that arise in their work that may involve inspections, building maintenance, and remedying structural defects.

Figure 7:
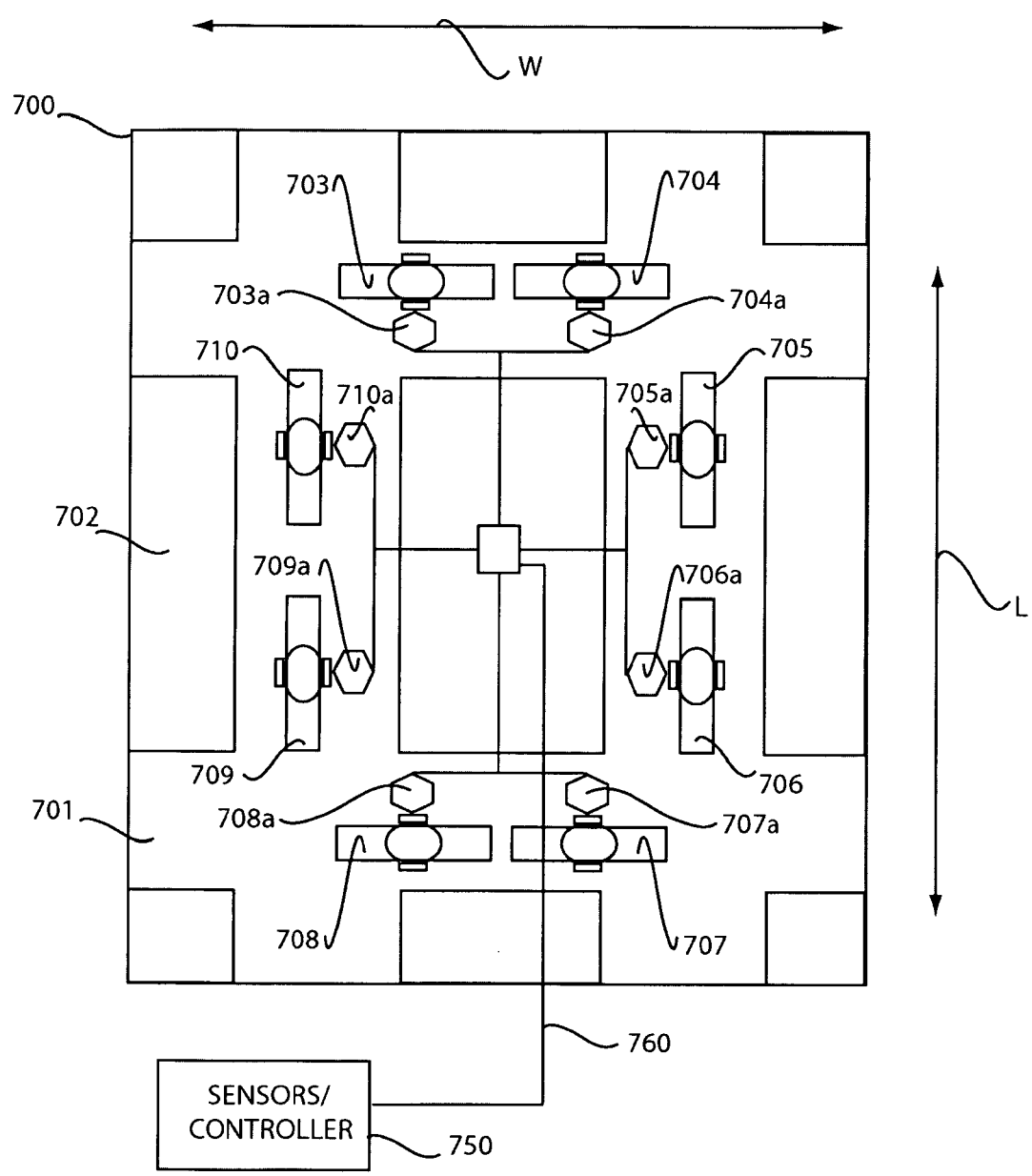
FIG. 7 and FIG. 8 illustrate diagrams of two grids representing an entire city block in which one or more structures, with actuators placed on each of the multiple energy absorbing devices, such as base isolators, that are placed strategically in and around the structure, and each which may respond to a different resonance frequency depending on the direction of movement of the disruptive force that can occur on the structure, for example, in a north-south direction or an east-west direction, in accordance with one embodiment of the present invention.
Figure 8:
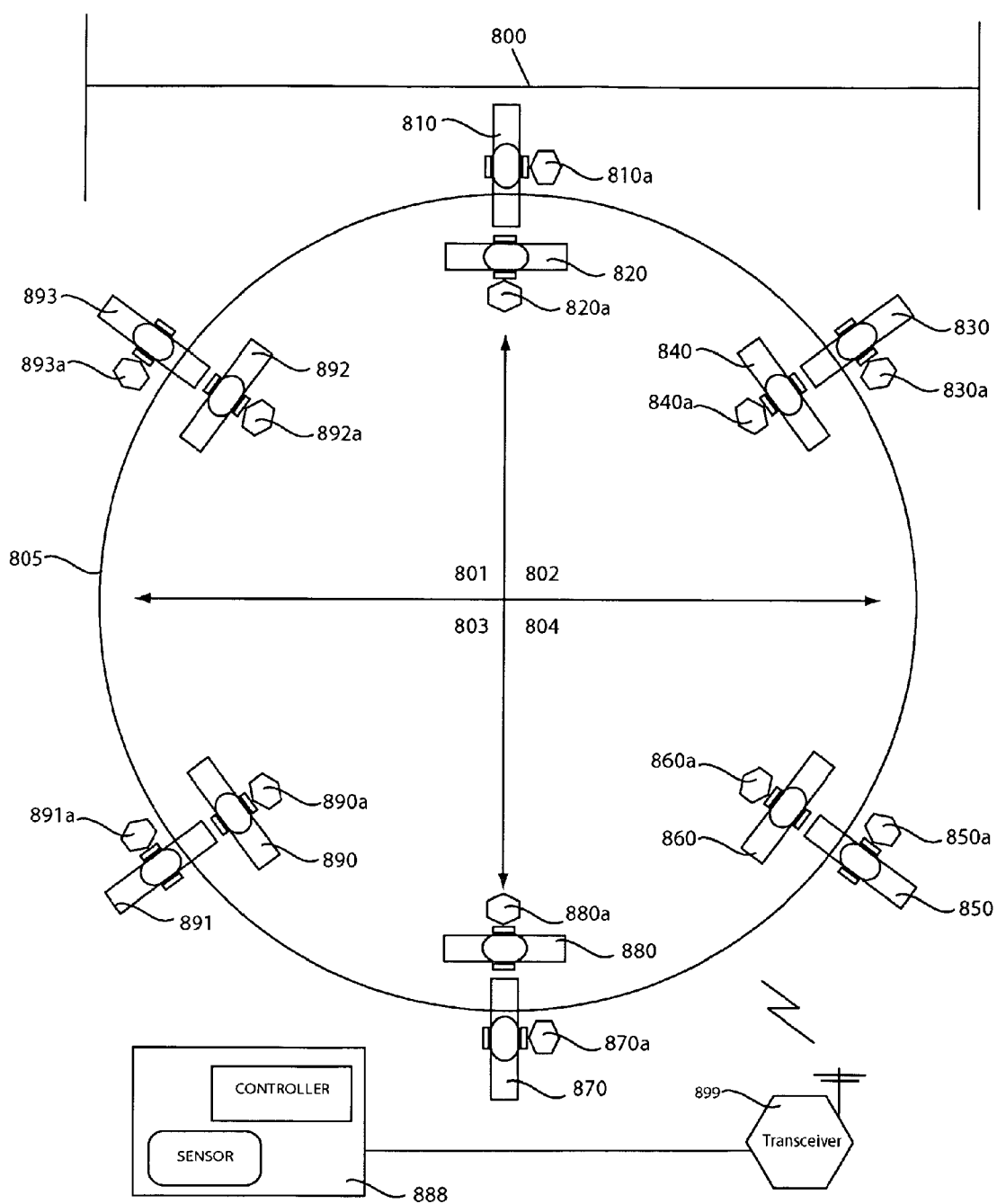

Turning next to FIG. 7 and FIG. 8, two exemplary configurations for placement of various energy absorbing devices coupled to actuators in accordance with one embodiment of the present invention are illustrated.

More specifically, FIG. 7 is a diagram representing a top view of a structure's support beams, or frame, adapted with several, base isolators (i.e. one or more variations of base isolator 400 or base isolator 500 coupled to one or more actuators).

While the present description is not intended to limit the disclosed automatic response energy dissipation system to exclusively implement base isolators, this example particularly focuses on explaining the manner in which such base isolators (i.e. base isolator 400 or base isolator 500) may react when activated in response or anticipation of a disruptive force.

The representation of a top view depicts structure 700 comprising of support members 701 (e.g. a frame or support beams for a building), which are coupled to structure 700's foundation 702, resting on various base isolators 703, 704, 705, 706, 707, 708, 709, and 710. Each base isolator is coupled to a corresponding actuator 703a, 704a, 705a, 706a, 707a, 708a, 709a, and 710a, wherein each actuator is configured to receive control signals from sensors/controller (system) 750.

Base isolators 703, 704, 708, and 707 may be positioned on support members 701 along a width W of structure 700, and base isolators 705, 706, 709 and 710, may be positioned along a length L of structure 700. This configuration is desirable so that structure 700 may withstand disruptive forces applied from a variety of directions, such as back and forth movements along the length of structure 700 or back and for the movements along the width of structure 700.

For example, and without limiting the scope of the present invention, a force applied along the width of structure 700 (i.e. parallel to base isolators 703 and 704) may activate base isolators 703, 704, 708, and 707 but not activate base isolators 705, 706, 709 and 710. Similarly, a force applied along the length of structure 700 (i.e. parallel to base isolators 705 and 706) may activate base isolators 705, 706, 709 and 710 but not activate base isolators 703, 704, 708, and 707. Naturally, a force that approaches from an angle neither perpendicular nor parallel with respect to either set of isolators may activate all devices proportionally, depending on the direction of the disruptive force.

The non-activated devices, during a particular event when a disruptive force is applied to structure 700, may comprise of a flexible characteristic or feature that allow for transfer of forces during a non-activation stage of the device. For example, as mentioned above, spacing 411 (see, FIGS. 4(b) and 4(c)) or similar methods (such as using actuators in spacing 411), which decrease stiffness or increase flexibility perpendicular to the direction of the displacement load, come into play when some devices are activated but other devices are not. This feature helps balance out the unidirectional limitation of the device which is otherwise desirable to allow for much easier mathematical modeling predictions that make structural engineering an easier, more efficient task for those skilled in the art.

During a disruptive event such as seismic forces exerted on structure 700, system 750 automatically processes and generates appropriate control signals to actuators 703a, 704a, 705a, 706a, 707a, 708a, 709a, and 710a via a communications medium 760. Each actuator in turn receives a specified control signal for tuning their respective base isolator to anticipate or respond in accordance with the structural requirements of structure 700. For example, and without limiting the scope of the present invention, tuning the actuators may increase structure 700's period, alter a base isolator's resonance frequency, or generate a damping force to dissipate vibrations created by the seismic event.

Finally turning to FIG. 8, another exemplary configuration is illustrated wherein base isolators are positioned or distributed throughout an area 800 wherein said area 800 comprises one or more buildings. For example, area 800 may comprise of an entire city block, wherein multiple base isolators such as base isolator 400 or base isolator 500, are configured in a substantially circular orientation 805.

Area 800 is typically divided into sectors, and each sector or means of dividing area 800 may be accomplished in any known manner; however as way of example, area 800 is represented here as comprising four quadrants 801, 802, 803, and 804. Dividing area 800 into several sectors, sections, divisions, or quadrants may be desirable to create a grid or means of identifying the location for each individual base isolator. For example, this may aid a controller sending signals to a particular base isolator by providing an 'address' depending on the base isolator's location in relation to the grid that makes up area 800.

This configuration may be desirably so that multiple range of motion is provided for one or more structures that may be erected within area 800. Furthermore, because a number of structures (i.e. several buildings within said city block) are all covered by the same system of base isolators, costs may be distributed among different entities rather than each separate structure having to implement its own base isolation system.

Configuration 800 may comprise one or more structures (i.e. different buildings), which may be present in quadrant 801, quadrant 802, quadrant 803 and quadrant 804, however, in alternative environment, configuration 800 may comprise of a single structure. Each of the base isolators, which are preferably of the type previously described herein, has an attached actuator connected to a controller and sensor system in accordance with the present invention. The base isolators are placed strategically around the structure, as shown by isolators 810, 820, 830, 840, 850, 860, 870, 880, 890, 891, 892, and 893 coupled to corresponding actuators 810a, 820a, 830a, 840a, 850a, 860a, 870a, 880a, 890a, 891a, 892a, and 893a. Each base isolator responds differently depending on the direction of the movement of the disruptive force, and in response to control signals sent from system 888, wherein system 888 comprises a controller and sensor system in accordance with the present invention.

Although system 888 may communicate or send tuning signals to each actuator for tuning each base isolator via any known methods without deviating from the scope of the present invention, in an exemplary embodiment (as illustrated), system 888 utilizes a transceiver 899 to wirelessly send control signals and communicate with each device of configuration 800.

System 800 may detect a disruptive event and generate control signals to wirelessly tune each device via transceiver 899. If the magnitude of a disruptive force occurs with greater force on the north-east side of configuration 800, for example quadrant 802, base isolators 810, 820, 830, and 840 may experience greater displacement than the remaining base isolators; however every actuator in configuration 800 will be sent signals to tune each isolator accordingly in a manner so as to absorb or dissipate the energy created by the disruptive force in effect.

Again, in the present disclosure, tune or tuning, as defined in the present herein, may refer to (without limitation): a process of selecting appropriate genetic operators and their respective parameters to suit a problem; a process of changing the parameters of a device or a system to achieve a specified or improved performance; a process of establishing a desired frequency of a system; or a variety of adjustments, modifications, alterations, or calibration to optimize performance of an overall system.

Although configuration 800 is particularly geared and designed for base isolators such as base isolators 400 or base isolator 500, an energy absorbing system in accordance with the present invention may include (without limitation): a passive energy control system, an active energy control system, a semi-active energy control system, a hybrid control system, or any other type of known energy control system directed at protecting structural integrity for a variety of applications, without deviating from the scope of the present invention.

Without limiting the scope of the present invention, it may be desirable to implement a base isolator such as base isolator 400 with the automatic response system disclosed herein. The concept of automatically tuning an energy absorbing device such as base isolator 400 is that the stiffness of the device will vary based on the time-history of a disruptive event (e.g. an earthquake, high winds, an explosion, etc.) detected by one or more sensors. Sensors then relay a signal to a controller, which has been configured with the mathematical properties for the structure's mass and stiffness, and computes or processes the ideal tuning (stiffness and or damping) for the energy absorbing device utilizing well known algorithms or processes.

For example, and without limiting the scope of the present invention, in one possible scenario, a response to a disruptive force the disruptive force sends signals to a sensor coupled to a controller. The controller directs the actuator to tighten or loosen base isolator 400's center bolt 408 that holds two steel plates 404 against rubber cover 401 and energy absorbing material 415. As plates 404 are pulled or pushed together by center bolt 408 (i.e. tightened or loosened), the stiffness and damping is modified for optimum protection of a building. This adjustment continues for the entire time-history of the sensor motion or disruptive event (e.g. earthquake, wind, blast, etc.).

This is an improvement over traditional systems currently in use, which may react to light winds and occupancy loads in a manner that causes the building to sway slightly; this sway is often felt by the occupants and causes an undesirable "sea sick" feeling. Thus, since such systems' sensitivity may not be adjusted, the structures or building which implement such technology are frequently affected with undesirable motion.

The automatically adjusted energy absorbing device (via sensors and actuators) may be tuned to be stiff and eliminate the slightest sway, making the building friendlier to its occupants. Meanwhile, the system is still capable of responding to a wide range of disruptive motions by adjusting the stiffness of the device, and properly responds to resist the most extreme disruptive force.

A system and method for adjusting the resonance frequency of an energy absorbing device attached to a structure has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. An automatic energy dissipation system, comprising:
    a sensor for detecting a disruptive force applied to a a building;
    a processor connected to said sensor, configured for determining a control signal based on a sensing data received from said sensor;
    an energy absorbing device, comprising an enclosure configured to house an energy absorbing material, the energy absorbing device installed between a superstructure of the building and a foundation of the building, in a manner so that the superstructure is isolated from the foundation; and
    an actuator, coupled to said processor and connected to said energy absorbing device, for tuning said energy absorbing device based on said control signal generated by said processor in order to alter a resonance frequency of said building.

2. The system of claim 1, wherein said tuning of said energy absorbing device comprises altering a resonance frequency of said building to reduce a structural response to said disruptive force applied to said building.

3. The system of claim 1, wherein said tuning of said energy absorbing device comprises generating a damping force to reduce a structural response to said disruptive force applied to said building.

4. The system of claim 3, wherein said damping force further comprises viscous damping.

5. The system of claim 3, wherein said damping force further comprises hysteretic damping.

6. The system of claim 3, wherein said energy absorbing device is configured as a variable friction damper.

7. The system of claim 3, wherein said energy absorbing device is configured as a variable viscous damper.

8. The system of claim 1, wherein said energy absorbing device is a base isolator configured for:
    adjusting a resonance frequency of said building; and
    generating a damping force to reduce a structural response to said disruptive force applied to said building.

9. The system of claim 8, wherein said base isolator further comprises:
    a base adapted to attach to a support member of said building; and
    a cover coupled to said base in a manner so as to form the enclosure, wherein said cover is adapted to attach to said base and said building and
    wherein said enclosure is coupled to said actuator in a manner so that a stiffness of said enclosure may be controlled by activating said actuator.

10. The system of claim 9, wherein said cover of said base isolator further comprises:
    a rigid layer;
    a resilient layer; and
    a plurality of side plates;
    wherein said rigid layer and said resilient layer are substantially semicircular in shape, having substantially the same center and having respective ends configured to attach to said base; and
    wherein said rigid layer acts as a restraining material for said resilient layer when said disruptive force is applied to said cover.

11. The system of claim 10, wherein said resilient layer of said cover is securely sandwiched between said side plates, said side plates being coupled to said actuator to adjust said damping force when said actuator is activated for said tuning.

12. The system of claim 10, wherein said cover is coupled to said support member of said building near a top portion of said semicircular shape of said rigid and resilient layers.

13. The system of claim 12, wherein said respective ends of said cover are coupled to a foundation of said building to provide a constant factor of initial and sliding friction between said rigid layer and said resilient layer for transferring tension and shear forces away from said building.

14. The system of claim 13, further comprising a plurality of actuators adapted to attach to said cover at said respective ends and said top portion of said semicircular shape for:
    tuning said constant factor of initial and sliding friction between said rigid layer and said resilient layer; and
    tuning said transferring tension and shear forces away from said building.

15. The system of claim 9, wherein said energy absorbing material enclosed in said cover of said base isolator further comprises a granular material, which provides vertical strength and allows for sideways slip when said disruptive force is applied.

16. The system of claim 9, wherein said energy absorbing material enclosed in said cover of said base isolator further comprises a liquid, which provides vertical strength and allows for sideways slip when said disruptive force is applied.

17. The system of claim 16, wherein said cover further comprises a valve to transfer said liquid into a spring loaded chamber whenever said disruptive force is applied; said spring loaded chamber having a spring positioned to push said liquid back into said cover whenever said cover is relieved from said disruptive force.

18. An automatic energy dissipation system, comprising:
    a sensor for detecting a disruptive force applied to a structure;
    a processor connected to said sensor, configured for determining a control signal based on a sensing data received from said sensor;
    a base isolator for coupling a lower portion of said structure and a foundation of said structure, wherein said structure rests on and is supported by said base isolator, said base isolator further comprising:
        a base adapted to attach to a support member of said structure;
        a cover coupled to said base in a manner so as to form an enclosure, wherein said cover is adapted to attach to said base and said structure;
        an energy absorbing material situated within said enclosure; and
        an actuator, coupled to said processor and connected to said base isolator in a manner so that a stiffness of said enclosure may be controlled by activating said actuator, for tuning said base isolator based on said control signal generated by said processor, wherein said tuning of said base isolator is for altering a resonance frequency of said structure to reduce a structural response to said disruptive force applied to said structure, and generating a damping force to reduce a structural response to said disruptive force applied to said structure.

* * * * *